(12) United States Patent  
Nutz et al.

(10) Patent No.: US 9,242,703 B2
(45) Date of Patent: Jan. 26, 2016

(54) HEIGHT-ADJUSTABLE SEAT FOR WATERCRAFT

(71) Applicant: Confluence Outdoor, LLC, Greenville, SC (US)

(72) Inventors: Hans Eric Nutz, Easley, SC (US); Lee Patrick Ward, Gaffney, SC (US)

(73) Assignee: Confluence Outdoor, LLC, Greenville, SC (US)

(*) Notice: Subject to any disclaimer, the term of this patent is extended or adjusted under 35 U.S.C. 154(b) by 0 days.

(21) Appl. No.: 14/227,935

(22) Filed: Mar. 27, 2014

(65) Prior Publication Data

US 2015/0274263 A1 Oct. 1, 2015

(51) Int. Cl.
*B63B 29/04* (2006.01)
*B63B 35/71* (2006.01)
*B60N 2/16* (2006.01)

(52) U.S. Cl.
CPC .............. *B63B 29/04* (2013.01); *B60N 2/1605* (2013.01); *B60N 2/1695* (2013.01); *B63B 35/71* (2013.01); *B63B 2029/043* (2013.01); *B63B 2035/715* (2013.01)

(58) Field of Classification Search
CPC .......... B63B 3/48; B63B 35/73; B63B 29/00; B63B 29/04; B63B 29/06
USPC ......................................................... 114/363
See application file for complete search history.

(56) References Cited

U.S. PATENT DOCUMENTS

| 3,795,927 A | 3/1974 | Darwin, Jr. et al. |
| 4,229,850 A | 10/1980 | Arcouette |
| 4,503,799 A | 3/1985 | Masters |
| 4,843,999 A | 7/1989 | Kobus et al. |
| 5,029,928 A | 7/1991 | Huber |
| 5,257,590 A | 11/1993 | Foote et al. |
| 5,450,809 A | 9/1995 | Melton |
| 5,460,551 A | 10/1995 | Beres |

(Continued)

FOREIGN PATENT DOCUMENTS

WO 03009725 A2 2/2003

OTHER PUBLICATIONS

DVC Seating System, Heritage Kayaks, Product Catalog, 2007, 1 pg.

(Continued)

*Primary Examiner* — Lars A Olson
(74) *Attorney, Agent, or Firm* — Womble Carlyle Sandridge & Rice, LLP

(57) ABSTRACT

Disclosed adjustable seat systems that provide a self-contained height-adjustable seat system for sit-on-top kayaking that allows the seat to be adjusted into various height and angle positions, while maintaining independent adjustment to the fore/aft position of the seat in the kayak. Some of the adjustable seat systems include a seat upper that includes a seat bottom and a seat back; a seat base adapted to slidably engage a flat surface in the watercraft; and at least two pivot mechanisms coupling the seat upper to the seat base, wherein the at least two pivot mechanisms allow the seat upper to be raised and lowered relative to the seat base. Some of the adjustable seat systems further include a front seat axis, a rear seat axis, a front base axis, and a rear base axis, a front pivot mechanism that pivotally engages both the front seat axis and the front base axis, and a rear pivot mechanism that pivotally engages both the rear seat axis and the rear base axis.

20 Claims, 6 Drawing Sheets

(56) References Cited

U.S. PATENT DOCUMENTS

| | | | |
|---|---|---|---|
| 5,580,130 | A | 12/1996 | Williams et al. |
| 5,899,780 | A | 5/1999 | Robbins |
| 5,970,903 | A | 10/1999 | McDonough et al. |
| 6,073,574 | A | 6/2000 | King et al. |
| 6,112,693 | A | 9/2000 | Addison |
| 6,210,242 | B1 | 4/2001 | Howard et al. |
| 6,431,109 | B1* | 8/2002 | Martin ................. 114/363 |
| 6,443,089 | B1 | 9/2002 | Goucher et al. |
| 6,629,724 | B2 | 10/2003 | Ekern et al. |
| 6,718,905 | B1 | 4/2004 | Peerson et al. |
| 6,736,084 | B2 | 5/2004 | McDonough et al. |
| 6,990,920 | B2 | 1/2006 | Hamilton et al. |
| 7,032,531 | B1 | 4/2006 | Caples |
| 8,573,146 | B2 | 11/2013 | Lee et al. |
| 8,651,576 | B2 | 2/2014 | Farber |
| 8,869,731 | B2 | 10/2014 | Dow et al. |
| 2005/0247255 | A1* | 11/2005 | Huse ................. 114/363 |
| 2008/0060569 | A1 | 3/2008 | Howard et al. |
| 2009/0038526 | A1 | 2/2009 | Walton |
| 2010/0045078 | A1 | 2/2010 | Lee et al. |
| 2013/0032080 | A1 | 2/2013 | Lee et al. |

OTHER PUBLICATIONS

Tall Back Backrest and Seat Pad with Pack, Wilderness Systems, Kayak Catalog, 2005, 1 pg.
Phase 3 Outfitting, Wilderness Systems, Product Catalog, 2004, 1 pg.
High Tech Seat Back, Wilderness Systems, Product Catalog, 2004, 1 pg.
Adjustable Back Band Seat Pan, Wilderness Systems, Product Catalog, 2004, 1 pg.
Roto Molded Contoured Seat with Backrest, Mad River Canoe, Product Catalog, 2005, 1 pg.
Rotomolded Seat, Mad River Canoe, Product Catalog, 2005, 1 pg.
Molded-In Seat with Thermafoam Seat Pad, Dagger, Catalog 2005, 1 pg.
FeelFree Gravity Kayak Seat, www.austinkayak.com/products/15027/FeelFree-Gravity-Kayak-seat.html (last viewed Jun. 17, 2015), last viewed Jun. 23, 2015, known at least as early as Mar. 27, 2014, 6 pgs.
Native Watercraft Hi/Low First Class Seat, www.nativewatercraft.com/features.cfm?id=19, last viewed Jun. 23, 2015, known at least as early as Mar. 27, 2014, 2 pgs.
Native Ultimate FX You Tube video published on Aug. 8, 2013, showing the low and high positions of the seat by YakAngler. Video available at https://www.youtube.com/watch?v=bGL7_Y68PiA. Last viewed Jun. 23, 2015. Screen shots provided and video available upon request, 1 pg.
Old Town Predator 13 Kayak: Episode 61, published on Jun. 13, 2013, showing the various seat positions by Fishyaker.com and Johnson Outdoors Pro Staff. Video available at https://www.youtube.com/watch?v=-dWvbPgzLT8. Last viewed Jun. 23, 2015. Screen shots provided and video available upon request. 2 pgs.

* cited by examiner

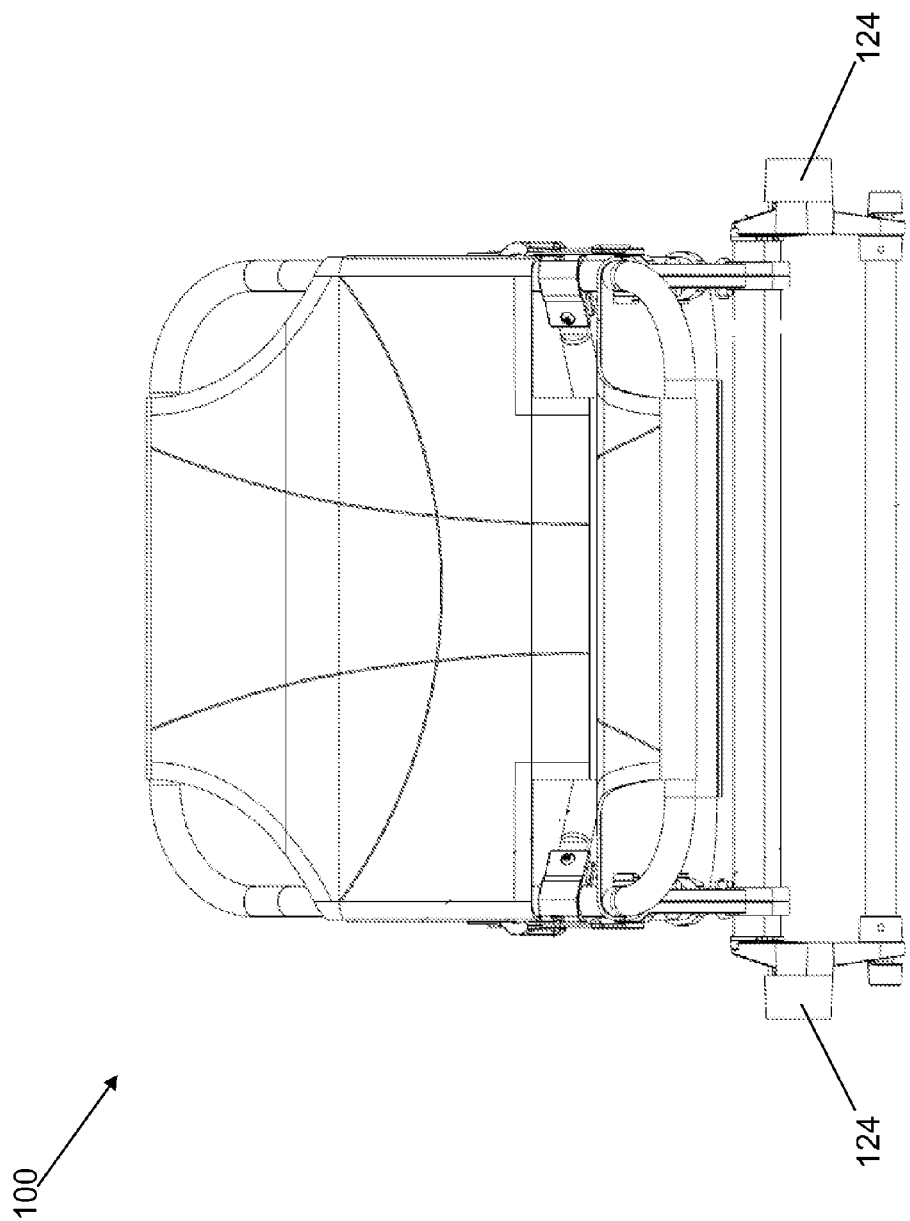

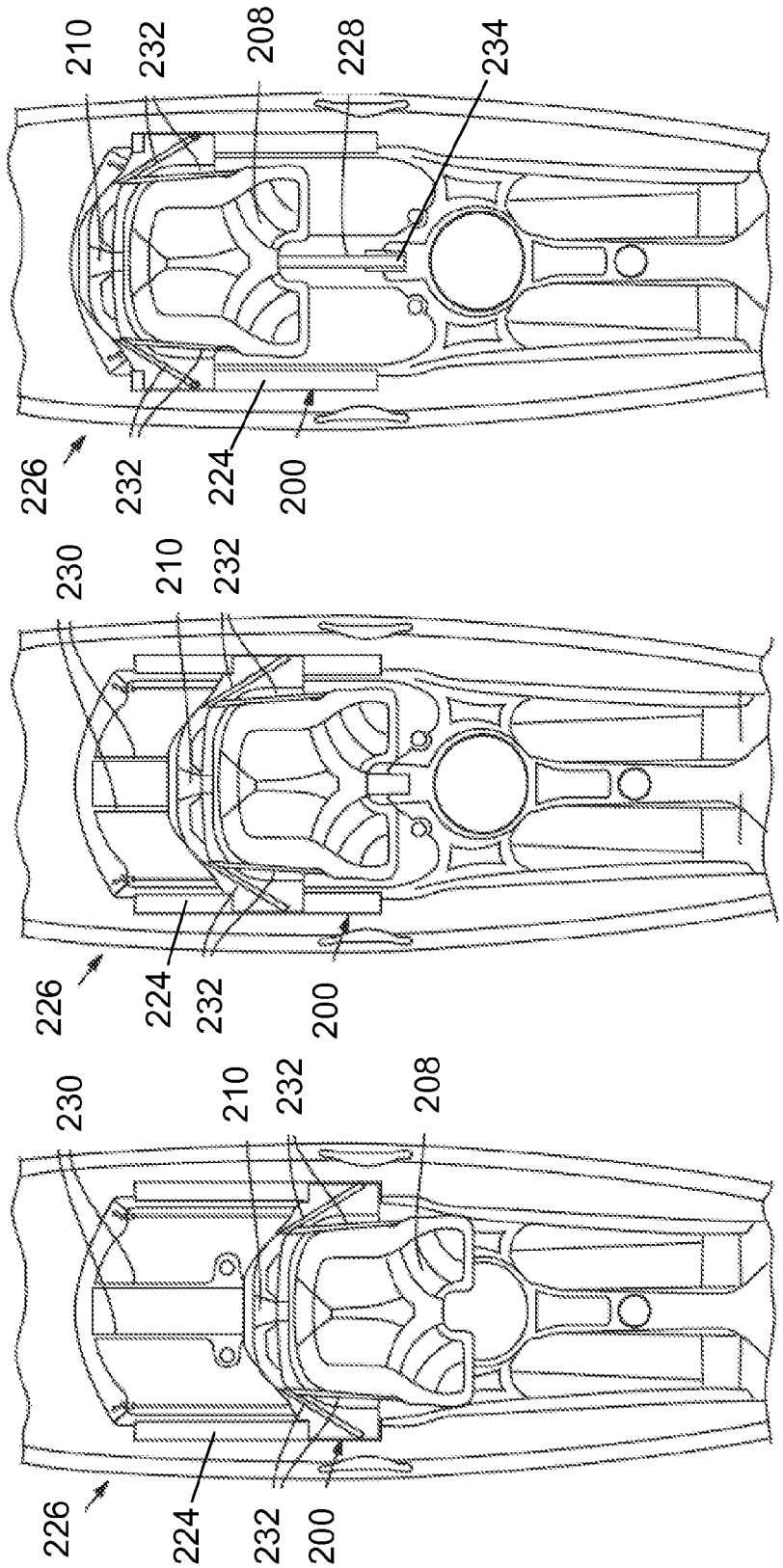

HEIGHT-ADJUSTABLE SEAT FOR WATERCRAFT

TECHNICAL FIELD

The present disclosure relates to convertible seats for watercraft, and more particularly to seat systems configured to provide both standard and elevated seating options for recreational watercraft, such as kayaks and the like.

BACKGROUND

Seats for kayaks typically are provided with a substantially horizontal seat bottom and a substantially vertical seat back. The seats may be adjustable to allow for incline adjustments for the seat back to accommodate paddlers of various heights. Height adjustability of the seat itself, however, typically is not provided.

The limited options that do exist for kayak seat height adjustments generally involve placing blocks or other rigid support structures beneath the entire seat structure. On-the-fly height adjustments, while afloat, for example, may be complicated and may require the paddler to carry the blocks or other rigid support structures at all times.

DRAWINGS

Embodiments will be readily understood by the following detailed description in conjunction with the accompanying drawings. Embodiments are illustrated by way of example and not by way of limitation in the figures of the accompanying drawings.

FIG. 5 is a front view of the height-adjustable seat system of FIG. 1, showing the seat upper in a raised position; and FIGS. 6A, 6B, and 6C illustrate three top views of an example of an adjustable seat in three different fore/aft adjustment positions, all in accordance with various embodiments.

DETAILED DESCRIPTION OF EMBODIMENTS OF THE INVENTION

Figure 1:
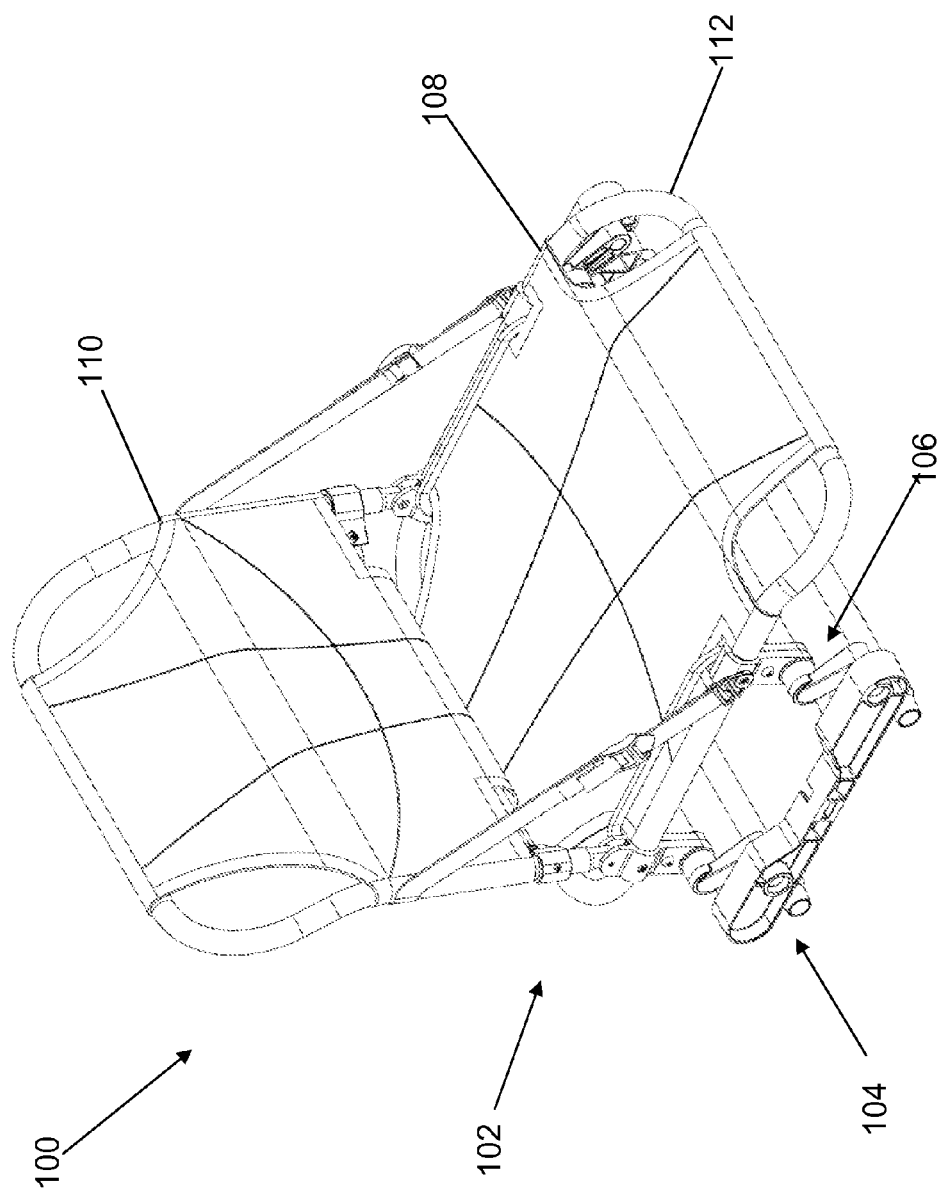
FIG. 1 is a perspective view of an example of a height-adjustable seat system for a watercraft.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

Embodiments of the present disclosure include adjustable seats for watercraft, such as seat systems configured to provide both standard and elevated seat options for recreational watercraft, such as kayaks and the like. For example, various embodiments provide a self-contained height-adjustable seat system for sit-on-top kayaking that allows the seat to be adjusted into various height and angle positions, while maintaining independent adjustment to the fore/aft position of the seat in the kayak. In various embodiments, the seat system may include a pivoting mechanism that allows both the height and the angle of the seat to be adjusted independently of each other, and a glide mechanism that allows the fore/aft position of the seat to be adjusted. Additionally, in various embodiments, the adjustable seating system may permit seat height adjustments that do not rely on the boat geometry for the various height positions.

In various embodiments, the seating system may include a seat upper that provides support for the paddler, and that includes a seat bottom and a seat back. In particular embodiments, the seat upper may have a frame, such as a tubing frame, and a suspended fabric seat bottom and/or seat back, such as a suspended mesh seat bottom and/or seat back. In various embodiments, the seat upper may be coupled to a seat base that provides a self-contained structure for supporting the seat upper while still allowing the base to be adjusted forward or backward (e.g., fore/aft) in the kayak. In various embodiments, the seat base may include one or more glide members, such as molded glide members, that engage and move along a corresponding flat element on the kayak body, such as a rail glide element, integral molded glide feature, or another flat portion on the kayak body. In various embodiments, the fore/aft adjustability of the seat system may be used for maintaining proper trim in the watercraft, thus optimizing hull performance.

In various embodiments, the seat upper may be coupled to the seat base via at least two pivot mechanisms (e.g., front and rear pivot mechanisms) that rotate about at least two substantially parallel axes located generally near the front and rear of the seat base to allow the seat upper to be lifted, lowered, and/or tilted into one of three positions: low (e.g., for paddling), high (e.g., for fishing and/or scouting), and reclining (e.g., for relaxing). In some embodiments, the seat upper may include two substantially parallel axes (e.g., front and rear seat axes), the base may have a corresponding pair of substantially parallel base axes (e.g., front and rear base axes), and one or more pivot mechanisms may each span the distance between and rotate about the corresponding seat upper axes and seat base axes, thus allowing the seat upper to be raised, lowered, and reclined (e.g., tilted with respect to the seat base) relative to the seat base.

For example, in various embodiments, each of the front and rear pivot mechanisms may be pivoted about their respective seat and base axes to position the seat upper in the high position (e.g., for fishing and/or scouting), for example by pivoting the pivot mechanisms to position both of the front and rear seat axes above the corresponding front and rear base axes. Likewise, in various embodiments, each of the front and rear pivot mechanisms may be pivoted about their respective seat and base axes to position the seat upper in the low position (e.g., for paddling), for example by pivoting the pivot mechanisms to position both of the front and rear seat axes below the corresponding front and rear base axes. Additionally, in various embodiments, to position the seat upper in the reclined position, the front pivot mechanism may be pivoted about its seat and base axes to position the front seat axis above the corresponding front base axis, the rear pivot mechanism may be pivoted about its seat and base axes to position the rear seat axis below the corresponding rear base axis, and thus tilting the seat bottom and seat back relative to the seat base. In various embodiments, all three positions may be achieved by utilizing one or more grab handles on the seat upper to rotate the seat higher, lower, or at an angle of recline in the kayak. In various embodiments, the seat back may be configured to be folded down onto the seat bottom when not in use, and the angle of the seat back may be independently adjusted relative to the angle of the seat bottom.

In various embodiments, the seat system may be provided with additional features such as glides, straps, and tensioning elements that may allow the seat system to be adjusted in a fore-and-aft direction, and that may allow the seat to be easily removed from the kayak and easily reinstalled. In some embodiments, the seat system my include a biasing element that biases the seat system in a rear-ward direction, and a tensioning element, such as a strap, that may be tensioned in order to slide the seat system forward on the one or more glide members. In various embodiments, when the tension in the tensioning element is released, the biasing element may move the seat system in a rearward direction.

FIG. 1 is a perspective view of an example of a height-adjustable seat for a watercraft. As shown in FIG. 1, in various embodiments, an adjustable seat system 100 as described herein may include a seat upper 102, for providing support to a user, a seat base 104, for coupling the adjustable seat system 100 to a watercraft, and a pivot mechanism 106, for allowing height adjustments between the seat upper 102 and the seat base 104. In various embodiments, the seat upper 102 may include a seat bottom 108 and a seat back 110, and may be formed from any suitable material including, for example, fabric, foam, metal, fiberglass, molded plastic, or a combination thereof, such as a tubular metal frame 112 supporting a suspended fabric or mesh seat bottom 108 or seat back 110. In various embodiments, the seat upper 102 may be configured with various adjustment capabilities.

Figure 2:
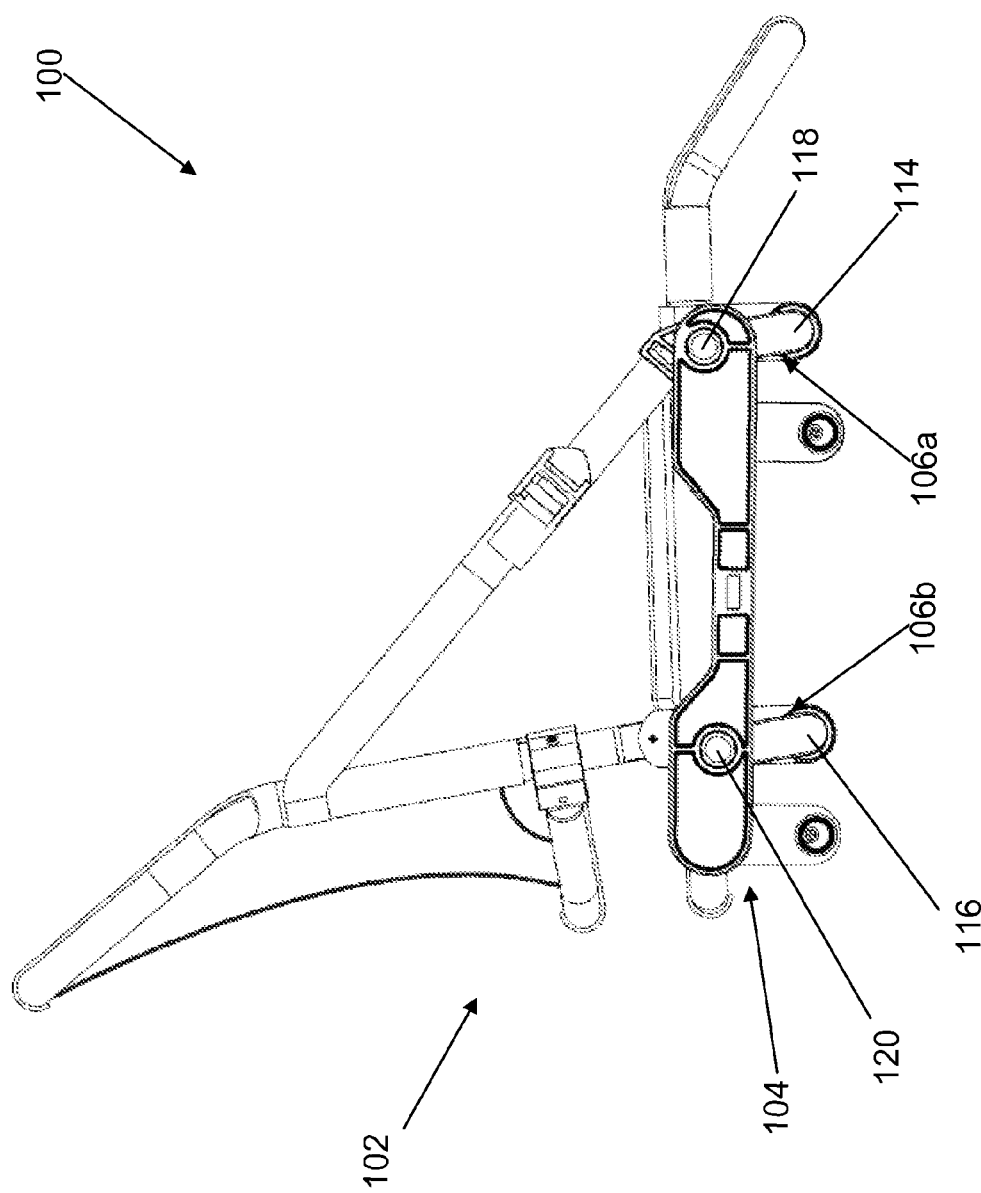
FIG. 2 is a side view of the height-adjustable seat system of FIG. 1, showing the seat upper in a lowered position.
Figure 3:
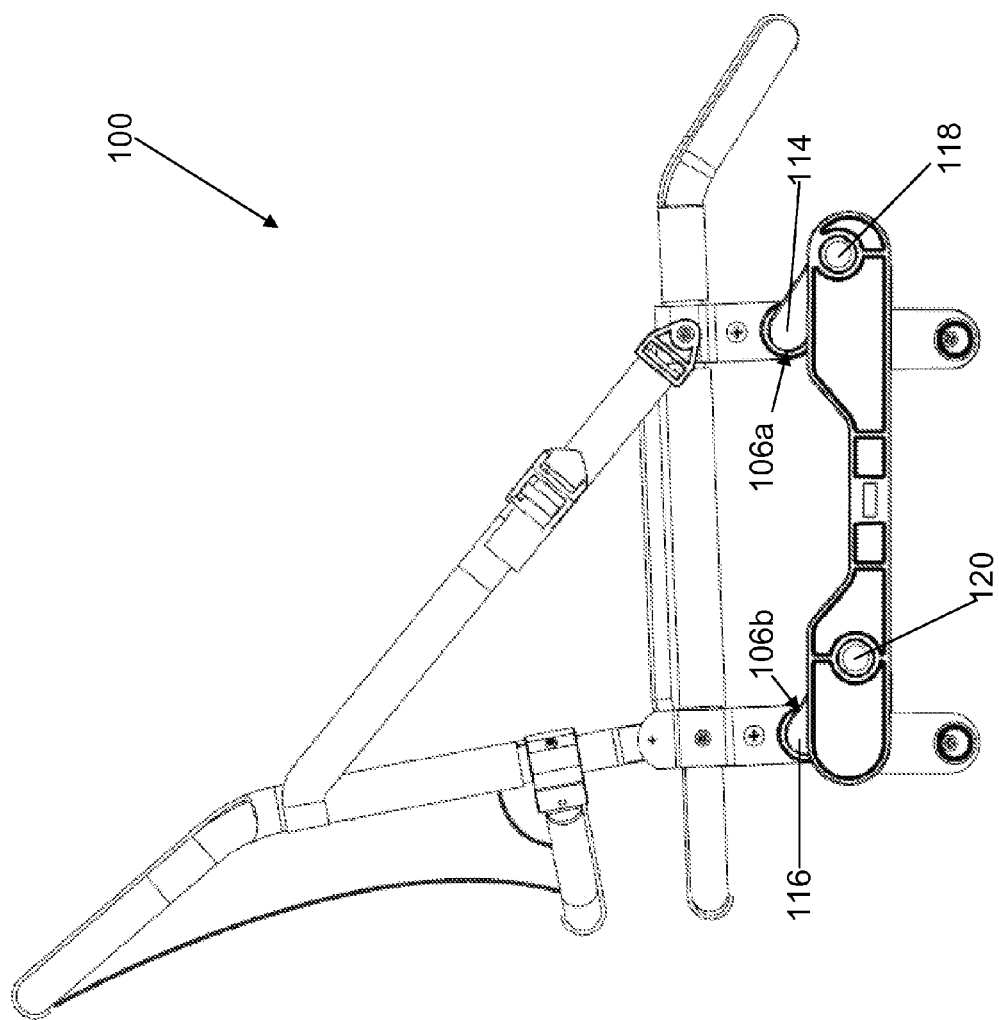
FIG. 3 is a side view of the height-adjustable seat system of FIG. 1, showing the seat upper in a raised position.
Figure 4:
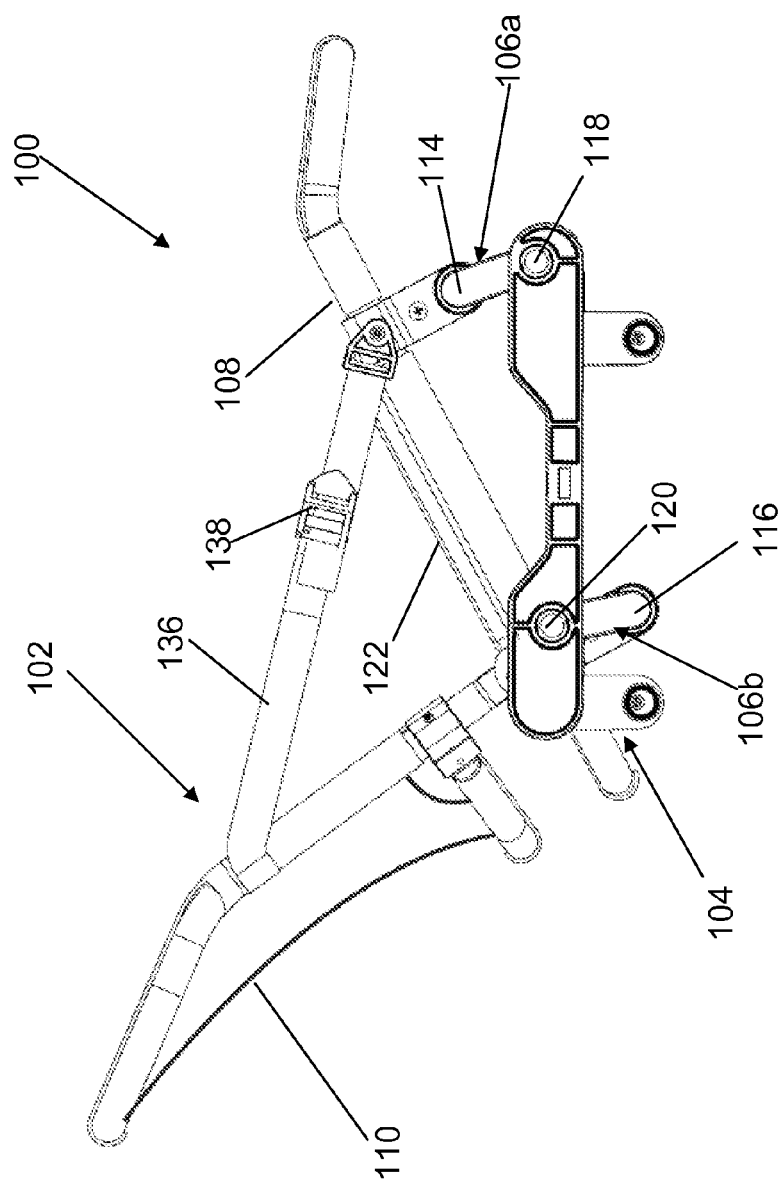
FIG. 4 is a side view of the height-adjustable seat system of FIG. 1, showing the seat in a reclined position.

For example, as can be best seen in FIGS. 2, 3, and 4, in some embodiments, the seat system 100 may include a seat upper 102 that may include a front seat axis 114 and a rear seat axis 116, and a seat base 104 that may include a fron base axis 118 and a rear base axis 120. In various embodiments, at least one front pivot mechanism 106a may pivotally couple the front seat axis 114 to the front base axis 118. Likewise, at least one front rear mechanism 106b may pivotally couple the rear seat axis 116 to the rear base axis 120.

For example, as shown in FIG. 2, in various embodiments, each of the front and rear pivot mechanisms 106a, 106b may be pivoted about their respective seat 114, 116 and base 118, 120 axes to position the seat upper 102 in the low position (e.g., for paddling) by pivoting the pivot mechanisms 106a, 106b to position both of the front and rear seat axes 114, 116 lower than the corresponding front and rear base axes 118, 120.

Likewise, as shown in FIG. 3, in various embodiments, each of the front and rear pivot mechanisms 106a, 106b, may be pivoted about their respective seat 114, 116 and base 118, 120 axes to position the seat upper 102 in the high position (e.g., for fishing and/or scouting) by pivoting the pivot mechanisms 106a, 106b to position both of the front and rear seat axes 114, 116 higher than the corresponding front and rear base axes 118, 120.

Additionally, as illustrated in FIG. 4, in various embodiments, to position the seat upper 102 in the reclined position, the front pivot mechanism 106a may be pivoted about its seat and base axes 114, 118 to position the front seat axis 114 higher than the corresponding front base axis 118, and the rear pivot mechanism 106b may be pivoted about its seat and base axes 116, 120 to position the rear seat axis 116 lower than the corresponding rear base axis 120, thus tilting both the seat bottom 108 and seat back 110 relative to the seat base 104.

As illustrated in FIG. 4, in various embodiments, all three positions may be achieved by utilizing one or more grab handles 122 on the seat bottom 108 to rotate the seat upper 102 higher, lower, or at an angle of recline in the kayak relative to the base 104. In some elements, grab handles 122 optionally may include a release mechanism to unlock the pivot mechanisms 106a, 106b and allow them to pivot. In some embodiments, releasing the grab handles 122 may re-engage a locking mechanism to prevent unintentional pivoting of the pivot mechanisms 106a, 106b. In some embodiments, the seat back 110 may include one or more seat back adjustment straps 136 for adjusting the angle between the seat back 110 and the seat bottom 108, for example by adjusting the strap tension through buckle 138.

FIG. 5 is a front view of the height-adjustable seat system of FIG. 1, illustrating the glide member 124 that allows the adjustable seat system 100 to be adjusted fore and aft when installed in the kayak. In some embodiments, the adjustable seat system 100 may be easily adjusted by a user for on-the-fly (e.g., seated) fore/aft adjustments of the seat. FIGS. 6A, 6B, and 6C illustrate three top views of an example of an adjustable seat in three different fore/aft adjustment positions, in accordance with various embodiments. In some embodiments, the adjustable seat 200 may include a seat bottom 208 and a seat back 210, and may removably couple to sit-on-top kayak 226. In various embodiments the glide member 224 of the adjustable seating system 200 may be situated on one or more slide bars or tracks in the kayak 226, and may be equipped with one or more adjustment straps 228 and tensioning elements 230 to permit fore and aft adjustments. In various embodiments, moving the seat system 200 to a more stern-ward position may open up a space in the cockpit that may provide foot room that may be needed when standing to fish or perform other standing activities. In various embodiments, moving the seat also may allow the paddler to adjust, for example on the fly, the bow-to-stern trim of the vessel for performance (e.g., tracking, weight distribution, bow buoyancy when going through a surf zone, static wind resistance (the direction the vessel points into the wind when stationary), and the like).

In some embodiments, adjustment strap 228 may couple to (for example, loop through) a buckle member (or another type of attachment member, such as a loop, ring, or slide), and the buckle member may also couple to one or more front kayak attachment elements 234, and therefore may couple adjustment strap 228 (and therefore adjustable seat system 200) to kayak 226. In some embodiments, this configuration may leave a free end of the adjustment strap 228, and a user may apply tension to the free end of adjustment strap 228 in order to move adjustable seat system 200 towards the bow of the kayak 226. Conversely, loosening adjustment strap 228 may allow the adjustable seat system 200 to move stern-ward, for instance because of tension on the adjustable seat system 200 from tension members 230. In some embodiments, decoupling the adjustment strap 228 or buckle member and tensioning members 230 or attachment elements from the kayak 226 may allow the adjustable seat system 200 to be quickly and easily removed from the kayak 226 by a user.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. An adjustable seating system for a watercraft, comprising:
   a seat upper comprising a seat bottom and a seat back;
   a seat base adapted to slidably engage a flat surface in the watercraft; and
   at least two pivot mechanisms coupling the seat upper to the seat base, wherein the at least two pivot mechanisms allow the seat upper to be raised and lowered relative to the seat base,
   wherein the seat back is tilt-adjustable, and
   wherein an angle of the seat back relative to the seat bottom is adjustable via one or more straps.

2. The seating system of claim 1, wherein raising the seat upper comprises pivoting the at least two pivot mechanisms in the same direction.

3. An adjustable seating system for a watercraft, comprising:
   a seat upper comprising a seat bottom and a seat back;
   a seat base adapted to slidably engage a flat surface in the watercraft; and
   at least two pivot mechanisms coupling the seat upper to the seat base, wherein the at least two pivot mechanisms allow the seat upper to be raised and lowered relative to the seat base,
   wherein the seat back is hingeably coupled to the seat bottom and adapted to fold substantially flat over the seat bottom.

4. The adjustable seating system of claim 3, wherein the adjustable seating system is configured to removably couple to the watercraft via one or more front adjustment straps and one or more rear tensioning members.

5. The seating system of claim 3, wherein raising the seat upper comprises pivoting the at least two pivot mechanisms in the same direction.

6. An adjustable seating system for a watercraft, comprising:
   a seat upper comprising a seat bottom and a seat back;
   a seat base; and
   at least two pivot mechanisms coupling the seat upper to the seat base,
   wherein the at least two pivot mechanisms allow the seat upper to be raised and lowered relative to the seat base,
   wherein the seat upper comprises a front seat axis and a rear seat axis fixed relative to the seat upper,
   wherein the seat base comprises a front base axis and a rear base axis fixed relative to the seat base, and
   wherein the at least two pivot mechanisms comprise a front pivot mechanism that pivotally engages both the front seat axis and the front base axis, and a rear pivot mechanism that pivotally engages both the rear seat axis and the rear base axis,
   wherein the seat bottom remains substantially horizontal as the seat upper is raised and lowered relative to the seat base.

7. The seating system of claim 6,
   wherein the seat base is adapted to slidably engage the watercraft.

8. The seating system of claim 6,
   wherein an angle of the seat back relative to the seat bottom is adjustable.

9. The seating system of claim 6,
   wherein the front pivot mechanism and the rear pivot mechanism are able to pivot independent from one another to position the seat upper in a reclined position.

10. The seating system of claim 6, wherein raising the seat upper comprises pivoting the at least two pivot mechanisms in the same direction.

11. An adjustable seating system for a watercraft, comprising:
    a seat upper comprising a seat bottom and a seat back;
    a seat base; and
    at least two pivot mechanisms coupling the seat upper to the seat base,
    wherein the at least two pivot mechanisms allow the seat upper to be raised and lowered relative to the seat base,
    wherein the at least two pivot mechanisms comprise a front pivot mechanism, and a rear pivot mechanism,
    wherein each pivot mechanism has a first position and a second position, where the first position is raised relative to the second position,
    wherein when the front and rear pivot mechanisms are each in the first position the seat bottom is substantially parallel with the seat base and the front pivot mechanism is parallel with the rear pivot mechanism;
    wherein when the front and rear pivot mechanisms are each in the second position, the seat bottom is substantially parallel with the seat base and the front pivot mechanism is parallel with the rear pivot mechanism.

12. The seating system of claim 11,
    wherein the seat base is adapted to slidably engage the watercraft.

13. The seating system of claim 11,
    wherein an angle of the seat back relative to the seat bottom is adjustable.

14. The seating system of claim 11,
    wherein the front pivot mechanism and the rear pivot mechanism are able to pivot independent from one another to position the seat upper in a reclined position.

15. The seating system of claim 11, wherein raising the seat upper comprises pivoting the at least two pivot mechanisms in the same direction.

16. An adjustable seating system for a watercraft, comprising:
    a seat upper;
    a seat base; and at least a front pivot mechanism and a rear pivot mechanism coupling the seat upper to the seat base to allow the seat upper to travel between a first position and a second position with respect to the seat base, where the first position is raised relative to the second position, wherein the seat upper in the first position is in a first location along a fore/aft direction of the watercraft, the seat upper in the second position is in a second location along a fore/aft direction of the watercraft, and the first location and the second location are different, wherein the front pivot mechanism is substantially parallel with the rear pivot mechanism in the first position, and the front pivot mechanism is substantially parallel with the rear pivot mechanism in the second position.

17. The seating system of claim 16, wherein the seat base is adapted to slidably engage the watercraft.

18. The seating system of claim 16, wherein the seat upper comprises a seat bottom and a seat back, and wherein an angle of the seat back relative to the seat bottom is adjustable.

19. The seating system of claim 16, wherein the front pivot mechanism and the rear pivot mechanism are able to pivot independent from one another to position the seat upper in a reclined position.

20. The seating system of claim 16, wherein raising the seat upper comprises pivoting the at least two pivot mechanisms in the same direction.

* * * * *